(12) United States Patent
Zhang

(10) Patent No.: US 12,466,124 B2
(45) Date of Patent: Nov. 11, 2025

(54) FILM APPLICATOR FOR EASY PACKAGING

(71) Applicant: Xiaolin Zhang, Shenzhen (CN)

(72) Inventor: Xiaolin Zhang, Shenzhen (CN)

( * ) Notice: Subject to any disclaimer, the term of this patent is extended or adjusted under 35 U.S.C. 154(b) by 0 days.

(21) Appl. No.: 19/089,504

(22) Filed: Mar. 25, 2025

(65) Prior Publication Data
US 2025/0332782 A1   Oct. 30, 2025

(30) Foreign Application Priority Data

Apr. 28, 2024   (CN) .......................... 202420909132.5

(51) Int. Cl.
*B29C 63/02*   (2006.01)
*B29C 63/00*   (2006.01)
B29L 31/34   (2006.01)

(52) U.S. Cl.
CPC .......... *B29C 63/02* (2013.01); *B29C 63/0004* (2013.01); *B29C 2063/0008* (2013.01); *B29L 2031/3475* (2013.01)

(58) Field of Classification Search
CPC . B29C 63/02; B29C 63/0004; B29C 63/0047; B29C 63/0056; B29C 63/0095; B29C 2063/0008; B29C 65/7802; B29C 65/7811; B29C 66/342; B29C 66/345; B29C 66/861; B29L 2031/3475; B29L 2031/3437
See application file for complete search history.

(56) References Cited

U.S. PATENT DOCUMENTS

2022/0055362 A1* 2/2022 Liu ...................... B32B 37/10

FOREIGN PATENT DOCUMENTS

DE   202013102944 U1 * 11/2013 ............. B29C 63/02

* cited by examiner

Primary Examiner — John L Goff, II
(74) Attorney, Agent, or Firm — JEEN IP LAW, LLC

(57) ABSTRACT

A film applicator that is convenient for packaging is provided, which includes a base, and the base is provided with a receiving groove, a first sliding element and a first connector, the first connector is located at an end of the base; a film sticking component including an installation bracket and a pressing film component, the installation bracket is provided with a second sliding element and a second connector. The second sliding element is slidably fitted with the first sliding element to guide the installation bracket to move back and forth along a film lamination direction. The second connector is connected and rotatably fitted with the first connector when the installation bracket slides to the end of the base, so that the installation bracket can be flipped relative to the base and aligned with or lower than an end face of the base, which is convenient to package.

9 Claims, 7 Drawing Sheets

FILM APPLICATOR FOR EASY PACKAGING

CROSS-REFERENCE TO RELATED APPLICATIONS

This application claims priority to Chinese Patent Application No. 202420909132.5, filed on Apr. 28, 2024, which is hereby incorporated by reference in its entirety.

TECHNICAL FIELD

The present disclosure relates to the field of film accessories technologies, and in particular, to a film applicator that is convenient for packaging.

BACKGROUND

At present, existing film applicators generally include a base with a receiving slot on one side for placing a mobile phone. When applying a film, the mobile phone is usually placed in the receiving slot, and then the film is placed on a mobile phone screen. The film is then subjected to reciprocating force on the film using a scraper or other structure, and then the release film is peeled off.

In order to prevent the formation of bubbles between the film and the screen, it is necessary to use structures such as scrapers to move back and forth on the base. If a scraper and a support structure for installing the scraper are provided on the base, it will increase the height of the entire film applicator. This will result in uneven heights at two ends of the film applicator during packaging, which can easily lead to uneven packaging. And the height of the packaging box used for packaging will also increase, which will increase packaging costs, especially in export packaging. If the height exceeds the standard, it will lead to a doubling of packaging costs.

SUMMARY

In order to overcome the shortcomings of existing technology, the purpose of the present disclosure is to provide a film applicator that is easy to package. When an installation bracket is slid to one end of the base, it can be rotated and connected by a first connector and a second connector to achieve a flipping of the installation bracket. After flipping relative to the base, the installation bracket can be aligned with or lower than an end face of the base, which is convenient for packaging.

The purpose of the present disclosure is achieved through the following technical solutions.

A film applicator that is convenient for packaging, including:
  a base, where the base is provided with a receiving groove, and the base is further provided with a first sliding element and a first connector, the first connector is located at an end of the base;
  a film sticking component, including an installation bracket and a pressing film component, the installation bracket is provided on the base, and the pressing film component is provided on the installation bracket, the installation bracket is provided with a second sliding element and a second connector; the second sliding element is slidably fitted with the first sliding element so as to guide the installation bracket to move back and forth along a film lamination direction; the second connector is configured to connect and rotatably fitted with the first connector when the installation bracket slides to the end of the base so as to flip the installation bracket relative to the base.

In some embodiments of the present disclosure, the first sliding element is a sliding groove, and the second sliding element is a sliding column; the sliding column is slidably fitted with the sliding groove; the first connector is provided at an end of the sliding groove.

In some embodiments of the present disclosure, a side wall of the sliding groove is provided with a notch, and the notch is configured for the sliding column to pass out when the installation bracket is flipped.

In some embodiments of the present disclosure, the first connector is a rotating shaft provided at the end of the sliding groove, and the second connector is a rotating groove provided on the installation bracket, the rotating groove is connected to the rotating shaft when the installation bracket slides to the end; and the rotating shaft is rotatably fitted with the rotating groove.

In some embodiments of the present disclosure, a side of the rotating groove is provided with a perforation configured for the rotating shaft to pass in or out.

In some embodiments of the present disclosure, the sliding groove is provided on a side wall of the receiving groove or on an outer wall of the base.

In some embodiments of the present disclosure, the end of the base is provided with a clearance groove, and the installation bracket is configured to be stored in the clearance groove after flipping relative to the base.

In some embodiments of the present disclosure, two support arms and a connection plate are provided on two sides of a bottom end of the base, and the connection plate is connected between the two support arms and spaced apart from an end face of the base, thereby forming the clearance groove.

In some embodiments of the present disclosure, the installation bracket includes two installation arms and an installation plate, bottom ends of the two installation arms are connected to two sides of the base; the installation plate is connected to top ends of two installation arms; the pressing film component is a rotatable rubber roller on the installation plate.

In some embodiments of the present disclosure, the base is provided with a positioning column.

Compared to existing technology, the beneficial effects of the present disclosure are as follows.

1. The pressing film component on the installation bracket can be pressed back and forth with the film on a mobile phone screen. During a back-and-forth movement of the installation bracket along the film lamination direction, the pressing film component scrapes off the film on the phone screen back and forth, which can fully discharge bubbles between the film and the mobile phone screen, resulting in better adhesion between the film and the mobile phone.

2. When packaging, the installation bracket can slide to the end of the base, so that the installation bracket can be flipped to be aligned with the base or lower than the upper end face of the base. This way, during packaging, the packaging height of the film applicator is the height of the base or the height of the installation bracket, rather than the sum height of the two. This can effectively reduce the packaging height, thereby reducing packaging costs and preventing inconsistent heights at various points of the packaging. After packaging, the film applicator can be transported in a stable state.

NUMERAL REFERENCE

Figure 1:
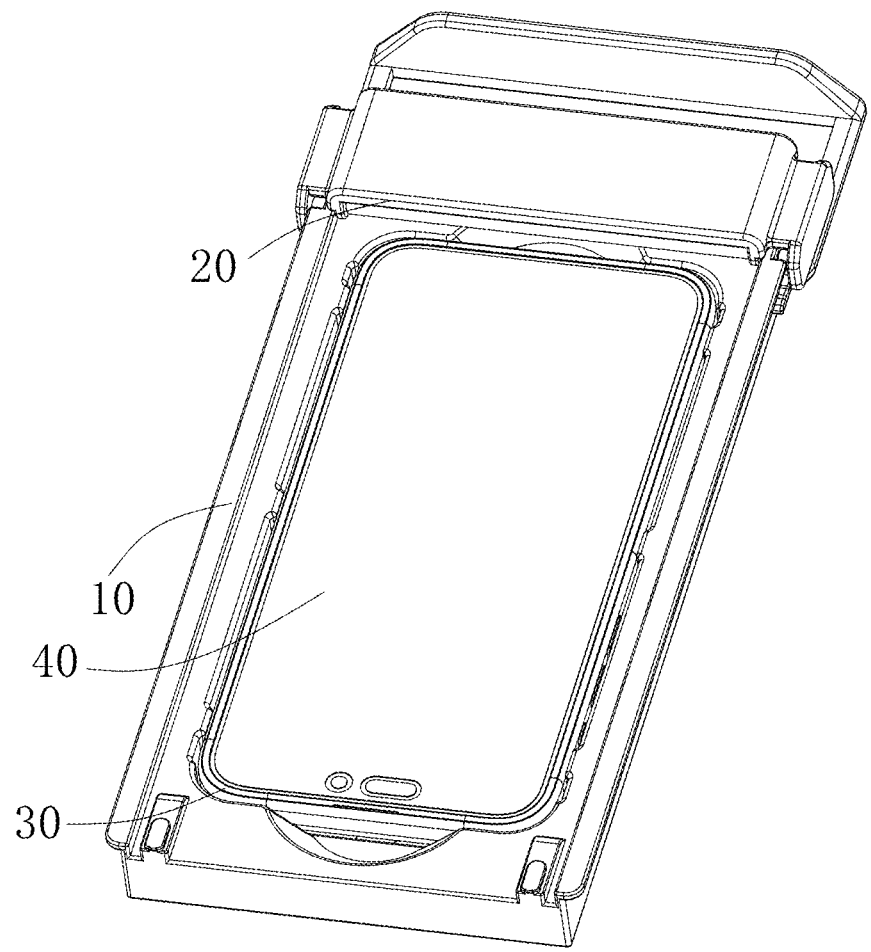
FIG. 1 is a schematic structural diagram of a film applicator used in combination with a mobile phone according to the present disclosure.
Figure 2:
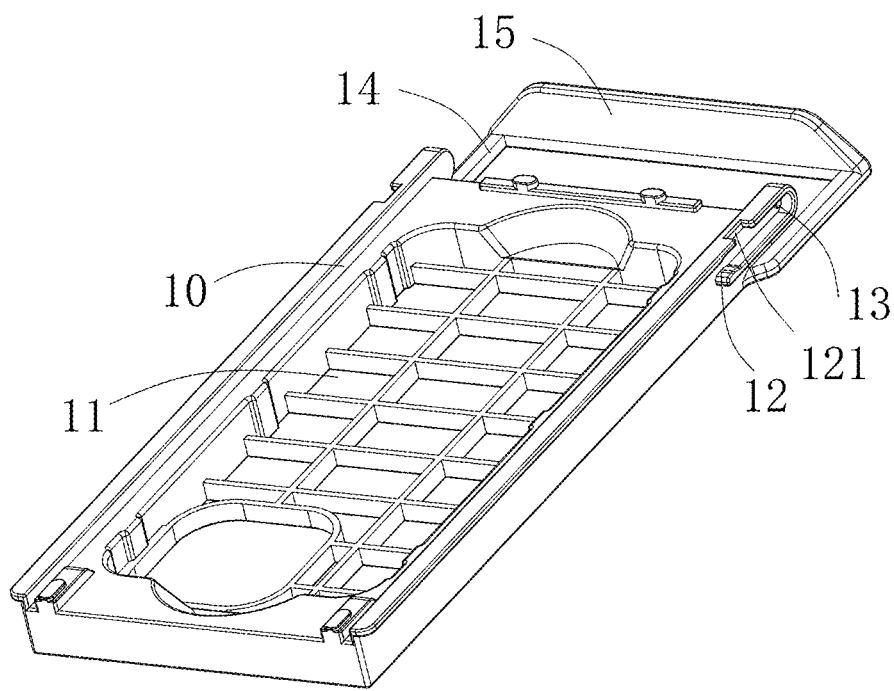
FIG. 2 is a first schematic structural diagram of a base of the present disclosure.

10—base; 11—receiving groove; 12—sliding groove; 121—notch; 13—rotating shaft; 14—support arm; 15—connection plate; 20—film sticking component; 21—installation bracket; 211—sliding column; 212—rotating groove; 213—perforation; 214—connection arm; 22—pressing film component; 30—mobile phone screen; 40—film.

DESCRIPTION OF EMBODIMENTS

Below, combined with the accompanying drawings and specific embodiments, the present disclosure is further described.

In the description of the present disclosure, it should be noted that terms "up", "down", "front", "back", "left", "right", "vertical", "horizontal", "top", "bottom", "inside", "outside" and other directional or positional relationships indicated are based on the directional or positional relationships shown in the accompanying drawings, only for a convenience of describing the present disclosure and simplifying the description, and do not indicate or imply that the device or component referred to must have a specific orientation, be constructed and operated in a specific orientation, and therefore cannot be understood as a limitation on the present disclosure.

Unless otherwise defined, all technical and scientific terms used in this specification have the same meanings as those commonly understood by those skilled in the art belonging to the present disclosure. Terms used in the specification of the present disclosure are only for a purpose of describing specific embodiments and are not intended to limit the present disclosure.

A film applicator that is convenient for packaging, as shown in FIGS. 1-7, includes a base 10 and a film sticking component 20. The base 10 is provided with a receiving groove 11, and the receiving groove 11 can accommodate an electronic device such as a mobile phone or a tablet that requires film lamination. A first sliding element and a first connector are provided on the base 10, and the first connector is provided at an end of the base 10.

The above-mentioned film sticking component 20 includes an installation bracket 21 and a pressing film component 22. The installation bracket 21 is provided on the base 10, and the pressing film component 22 is provided on the installation bracket 21. There is a second sliding element on the installation bracket 21, the installation bracket 21 is provided with a second sliding element and a second connector. When assembling the installation bracket 21 with the base 10, the second sliding element is slidably fitted with the first sliding element to guide the installation bracket 21 to move back and forth along a film lamination direction. When the installation bracket 21 slides to the end of the base 10, the second connector can connect and be ratably fitted with the first connector so as to flip the installation bracket 21 relative to the base 10.

On the basis of the above structure, when using the film applicator that is convenient for packaging of the present disclosure, it has two use states.

Figure 4:
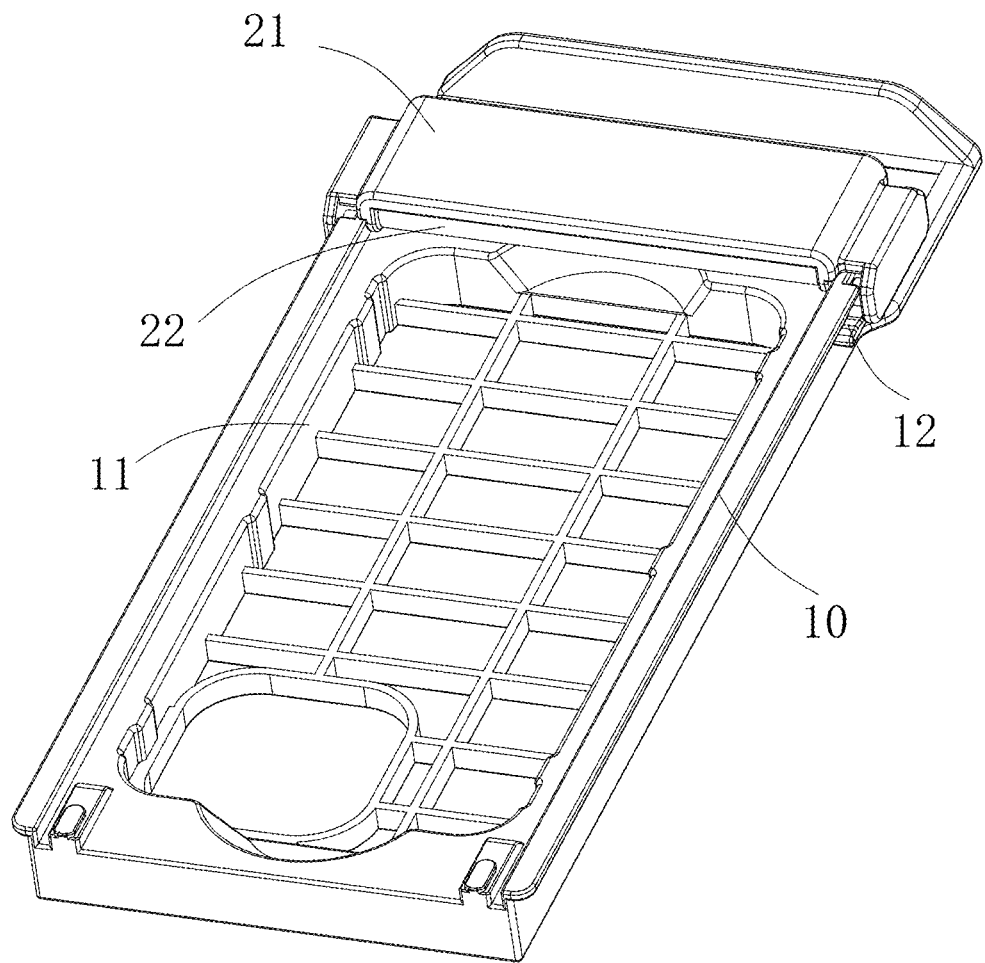
FIG. 4 is a first state schematic structural diagram of the base and a film sticking component of the present disclosure.

A first use state, as shown in FIGS. 1 and 4, which involve film lamination on an electronic screen. Taking film lamination to a mobile phone as an example, the mobile phone screen is placed in the receiving groove 11 of the base 10 with the screen facing upwards. Then, the film is placed on the mobile phone screen, and a release film on the film is peeled off. This allows the second sliding element of the installation bracket 21 to slide relative to the first sliding element of the base 10, allowing the pressing film component 22 on the installation bracket 21 to press back and forth with the film on the mobile phone screen. During a process of reciprocating the installation bracket 21 in the film lamination direction, the pressing film component 22 scrapes off the film on the mobile phone screen, thereby effectively removing any air bubbles between the film and the mobile phone screen. In this way, the film fits better with the mobile phone.

Due to the fact that in the first state, the installation bracket 21 slides back and forth on the base 10 to allow the pressing film component 22 to press the film back and forth on the mobile phone screen, the installation bracket 21 is in a state higher than an end face of the base 10 in the first use state. At this time, a packaging height is a height of the base 10 itself and a height of the installation bracket 21, resulting in a higher overall packaging height; and the installation bracket 21 is located at one of the positions of the base 10, which means that the height of this position is higher than that of other positions, resulting in irregular packaging and empty packaging space.

Figure 5:
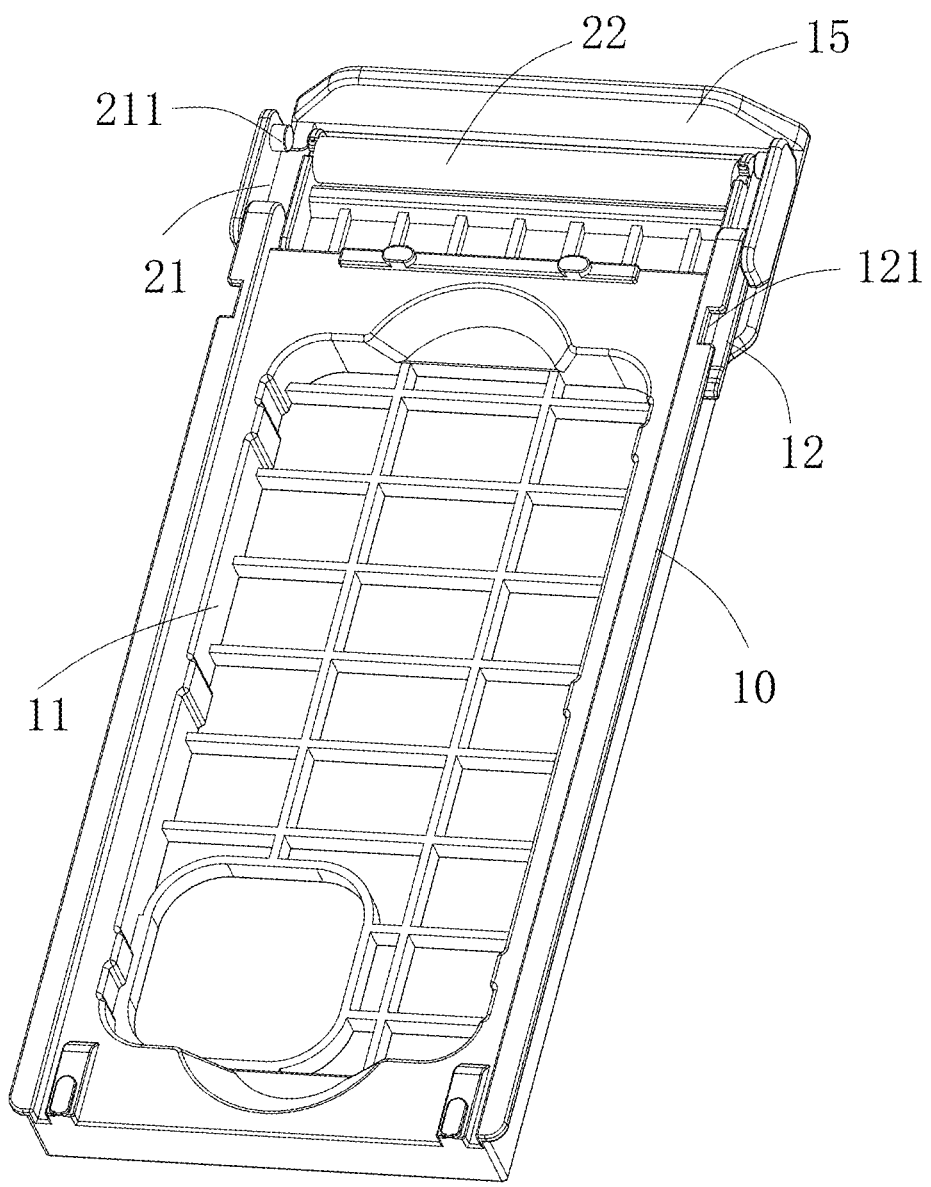
FIG. 5 is a second state schematic structural diagram of the base and film sticking component of the present disclosure.
Figure 6:
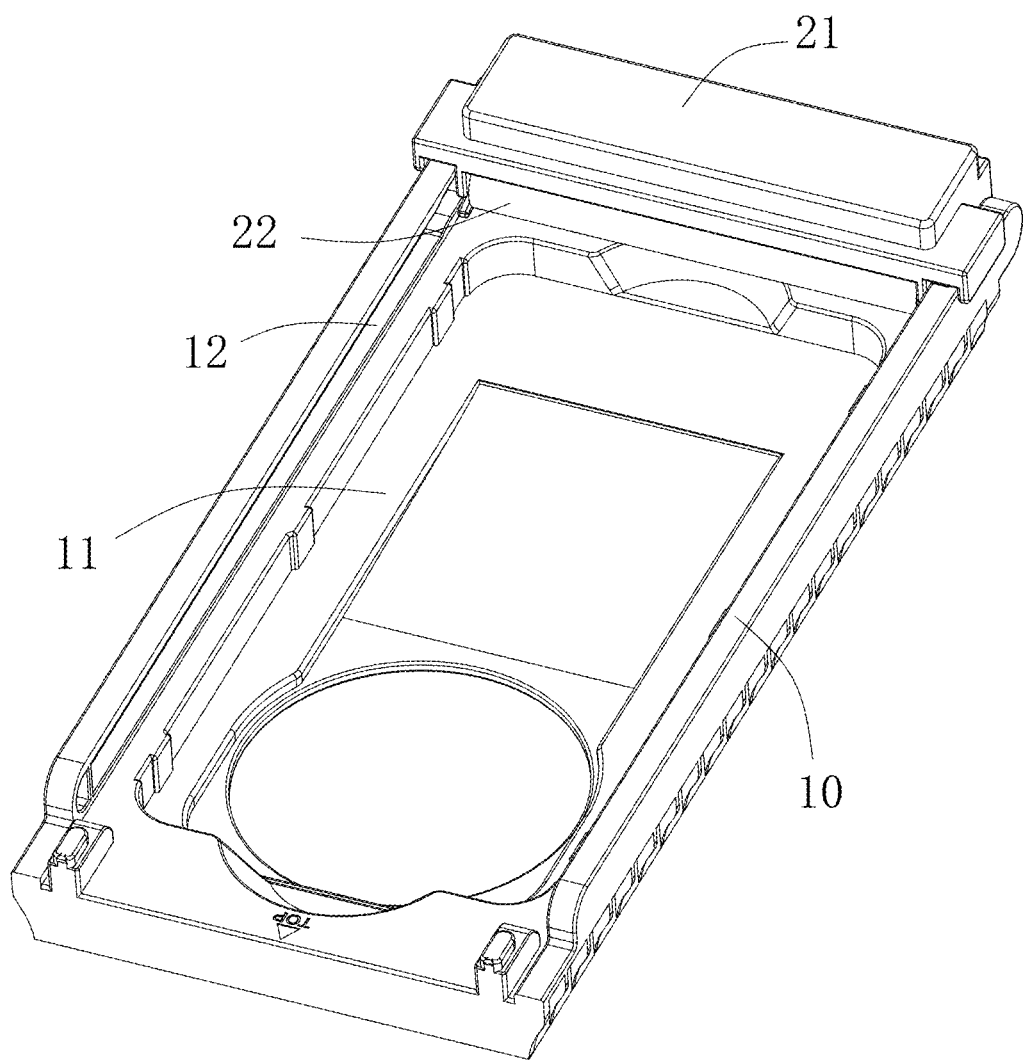
FIG. 6 is a third schematic structural diagram of the base and film sticking component of the present disclosure.
Figure 7:
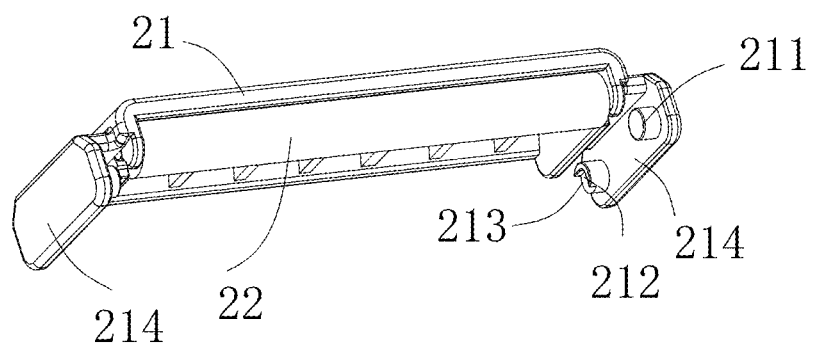
FIG. 7 is a schematic structural diagram of the film sticking component of the present disclosure.

Therefore, in this embodiment, when packaging, the installation bracket 21 can be slid to the end of the base 10 through the second sliding element and the first sliding element, so that the second connector on the installation bracket 21 is connected and rotatably fitted with the first connector. At this time, the installation bracket 21 can be flipped relative to the base 10. Since the installation bracket 21 is located at the end of the base 10 at this time, it can be flipped towards an outer side of the end of the base 10, which has a clearance space that can avoid the installation bracket 21, so that the installation bracket 21 can be flipped to be aligned with or lower than an upper end surface of the base 10. That is, the film applicator is in a second use state, as shown in FIG. 5. In this state, the film applicator can be in a packaging and transportation state, the installation bracket 21 is flushed with the base 10 or can be lower than the upper end face of the base 10. In this way, when packaging, the packaging height of the film applicator is the height of the base 10 or the height of the installation bracket 21, rather than the sum height of the two. This can effectively reduce the packaging height, thereby reducing packaging costs and preventing inconsistent heights at various points of the packaging. After packaging, the film applicator can be transported in a stable state.

In an implementation mode, the first sliding element is a sliding groove 12, and the second sliding element is a sliding column 211. Therefore, when the installation bracket 21 is slid relative to the base 10, the sliding column 211 on the installation bracket 21 can be slidably fitted with the sliding groove 12 on the base 10. In this way, when the installation bracket 21 is slid, the sliding column 211 is slid inside the sliding groove 12 to guide the installation bracket 21 to slide back and forth.

On the basis of this structure, the first connector mentioned above is provided at one end of the sliding groove 12. In this way, when the installation bracket 21 is slid, the sliding column 211 is slid to the end of the sliding groove 12, which can guide the second connector on the installation bracket 21 to correspond with the first connector at the end of the sliding groove 12, thereby achieving a rotational connection.

Of course, the first sliding element mentioned above can also have a slide rail structure, and the second sliding element can also be selected as a pulley, which can achieve sliding guidance of the installation bracket 21 through a sliding cooperation between the pulley and the slide rail. A specific structure of the sliding element can be selected and set according to an actual need.

In an implementation mode, a side wall of the sliding groove 12 is provided with a notch 121, and the notch 121 can be configured for the sliding column 211 to pass through when the installation bracket 21 flips. Based on this structure, when the sliding column 211 of the installation bracket 21 slides to the end of the sliding groove 12, the sliding column 211 can correspond to the notch 121 on the side wall of the sliding groove 12, and the second connector of the installation bracket 21 corresponds to and is rotatably fitted with the first connector at the end of the sliding groove 12. In this way, when flipping the installation bracket 21 towards an outer side of the base 10, the sliding column 211 can pass through the notch 121, which prevents interference from the side wall of the sliding groove 12 on the flipping of the installation bracket 21.

In an implementation mode, the first connector mentioned above is a rotating shaft 13, and the rotating shaft 13 is provided at one end of the sliding groove 12. Correspondingly, the second connector mentioned above is a rotating groove 212, and the rotating groove 212 is provided on the installation bracket 21. When the installation bracket 21 slides to the end, the rotating shaft 13 inside the sliding groove 12 of the base 10 can be inserted and threaded into the rotating groove 212 of the installation bracket 21, and the rotating shaft 13 is rotatably fitted with the rotating groove 212. In this way, the installation bracket 21 can be flipped based on the rotating shaft 13.

In an implementation mode, in order to facilitate a sliding process of the installation bracket 21, the rotating shaft 13 in the sliding groove 12 can extend into the rotating groove 212 and be connected to it. A perforation 213 can be provided on a side of the rotating groove 212. When the installation bracket 21 slides towards the end, the rotating shaft 13 can pass through the perforation 213 and is slidably fit with the rotating groove 212 so as to achieve the flipping of the installation bracket 21. When the installation bracket 21 needs to slide, and the pressing film component 22 performs a film lamination action, the installation bracket 21 is flipped over to a top of the base 10, the installation bracket 21 is slid, and the rotating shaft 13 can pass through the perforation 213 and pass out the rotating groove 212 so as to achieve normal sliding and pressing film action.

Of course, a rotating hole can also be provided at the end of the sliding groove 12 to form the first connector, and a spring pin can be provided on the installation bracket 21 to form the second connector. When the installation bracket 21 slides to the end of the sliding groove 12, the spring pin structure can pop out and be inserted into the rotating hole, thus achieving a rotatable connection between the installation bracket 21 and the base 10, which can be flipped. When the installation bracket 21 slides, the installation bracket 21 is flipped over to the top of the base 10, and under an external force, the spring pin exits the rotating hole structure.

Figure 3:
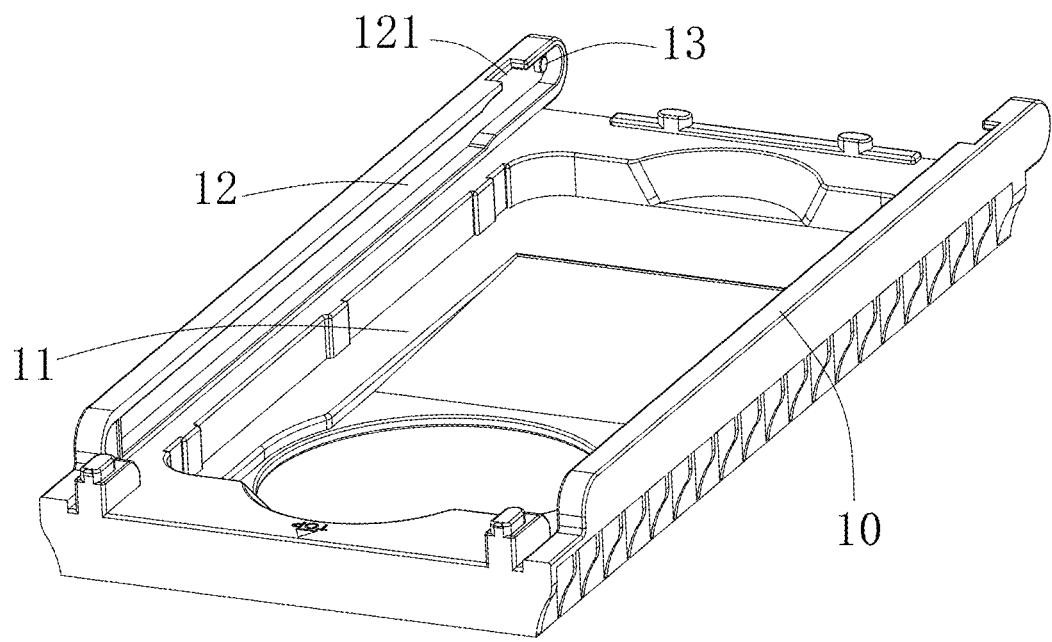
FIG. 3 is a second schematic structural diagram of the base of the present disclosure.

In an implementation mode, the above-mentioned sliding groove 12 has two installation positions, one of which is to arrange the sliding groove 12 structure on a side wall of the receiving groove 11, as shown in FIG. 3. At this time, the sliding column 211 on the installation bracket 21 can be provided on an outer side of the installation bracket 21, so that two sides of the installation bracket 21 can extend into the receiving groove 11 and be slidably fitted with an inner wall of the receiving groove 11, that is, an embedded sliding assembly.

Another structure is to arrange the sliding groove 12 on an outer wall of the base 10, that is, outside the receiving groove 11. At this time, it is provided at an inner side of the installation bracket 21, and two sides of the installation bracket 21 can abut against the outer wall of the base 10 and be slidably fitted with the outer wall of the base 10.

In an implementation mode, a clearance groove can be provided at the end of the base 10. When packaging the film applicator, the installation bracket 21 can slide to the end of the base 10, and then the installation bracket 21 can be flipped relative to the outside of the end of the base 10 into the clearance groove. In this way, the installation bracket 21 can be folded and stored in the clearance groove. Since the clearance groove can avoid the installation bracket 21, it can also render the installation bracket 21 in a stable storage state after flipping. This renders the structure more stable during packaging, and the clearance groove can prevent the installation bracket 21 from shaking after flipping.

In an implementation mode, two support arms 14 and a connection plate 15 may be provided on two sides of a bottom end of the base 10. The connection plate 15 is connected between the two support arms 14 and spaced apart from an end face of the base 10, thereby forming the clearance groove. In this way, the two support arms 14 can form a support bottom surface of the clearance groove, which is flush with a bottom end face of the base 10. A spacing between the connection plate 15 and the end face of the base 10 can accommodate the installation bracket 21 after flipping. After flipping, the installation bracket 21 remains flush with a top end face of the base 10, and the storage structure is stable.

Of course, the above-mentioned clearance groove can also be directly processed at the end of the base 10. The clearance groove and the receiving groove 11 are spaced apart in a length direction of the base 10, and a flipping position of the installation bracket 21 can be between the two grooves. Or two support arms can be omitted, and an outward extending support plate structure can be provided at a bottom of the base 10 to support the installation bracket 21 after it is flipped over as a whole.

It should be noted that using two support arms and one connection plate, or using the support plate to provide at the end of the base, not only forms a clearance support structure, but also allows the connection plate to be used as a handheld structure for the film applicator when the installation bracket is flipped over to the top of the base for film lamination.

In an implementation mode, the above-mentioned installation bracket 21 includes two installation arms and an installation plate, bottom ends of the two installation arms are connected to two sides of the base 10, and the installation plate is connected to top ends of the two installation arms. In this way, during assembly, the second sliding element and the second connector can be provided at bottoms of the installation arms. During assembly, the two installation arms can abut against and be slidably fitted with the outer wall of the base 10 on two sides; or the two installation arms can abut against inner walls on two sides of the receiving groove 11 and slidably fitted with an inner side wall of the receiving groove 11.

The above-mentioned pressing film component 22 can be a rubber roller structure that can be rotatably provided on the installation plate. In this way, during film lamination, the rubber roller rolls back and forth to achieve an action of exhausting bubbles, reducing the scratching of the film and achieving better exhaust bubble effect.

In an implementation mode, a positioning column can be further provided on the base 10, this positioning column can be provided at one end of the base 10 away from a starting position of the installation bracket 21. Due to the convenience of positioning the existing film, a positioning hole is provided on the film. Therefore, the positioning column structure provided on the base 10 of the film applicator corresponds to the positioning hole of the film, achieving more accurate positioning of the film during film lamination and the position of the film is more accurate.

For those skilled in the art, various other corresponding changes and deformations can be made based on the technical solutions and concepts described above, and all of these changes and deformations should fall within the protection scope of claims of the present disclosure.

What is claimed is:

1. A film applicator that is convenient for packaging, comprising:
    a base, wherein the base is provided with a receiving groove, and the base is further provided with a first sliding element and a first connector, the first connector is located at an end of the base;
    a film sticking component, comprising an installation bracket and a pressing film component, the installation bracket is provided on the base, and the pressing film component is provided on the installation bracket, the installation bracket is provided with a second sliding element and a second connector; the second sliding element is slidably fitted with the first sliding element so as to guide the installation bracket to move back and forth along a film lamination direction; the second connector is configured to connect and rotatably fitted with the first connector when the installation bracket slides to the end of the base so as to flip the installation bracket relative to the base;
    wherein the first sliding element is a sliding groove, and the second sliding element is a sliding column, the sliding column is slidably fitted with the sliding groove; the first connector is provided at an end of the sliding groove.

2. The film applicator according to claim 1, wherein a side wall of the sliding groove is provided with a notch, and the notch is configured for the sliding column to pass out when the installation bracket is flipped.

3. The film applicator according to claim 1, wherein the first connector is a rotating shaft provided at the end of the sliding groove, and the second connector is a rotating groove provided on the installation bracket,
    the rotating groove is connected to the rotating shaft when the installation bracket slides to the end; and the rotating shaft is rotatably fitted with the rotating groove.

4. The film applicator according to claim 3, wherein a side of the rotating groove is provided with a perforation configured for the rotating shaft to pass in or out.

5. The film applicator according to claim 1, wherein the sliding groove is provided on a side wall of the receiving groove or on an outer wall of the base.

6. The film applicator according to claim 1, wherein the end of the base is provided with a clearance groove, and the installation bracket is configured to be stored in the clearance groove after flipping relative to the base.

7. The film applicator according to claim 6, wherein two support arms and a connection plate are provided on two sides of a bottom end of the base, and the connection plate is connected between the two support arms and spaced apart from an end face of the base, thereby forming the clearance groove.

8. The film applicator according to claim 1, wherein the installation bracket comprises two installation arms and an installation plate,
    bottom ends of the two installation arms are connected to two sides of the base;
    the installation plate is connected to top ends of two installation arms;
    the pressing film component is a rotatable rubber roller on the installation plate.

9. The film applicator according to claim 1, wherein the base is provided with a positioning column.

* * * * *